(12) United States Patent
Gao et al.

(10) Patent No.: US 9,394,636 B2
(45) Date of Patent: Jul. 19, 2016

(54) ENHANCED BRAIDED SLEEVE AND METHOD OF CONSTRUCTION THEREOF

(71) Applicant: Federal-Mogul Powertrain, Inc., Southfield, MI (US)

(72) Inventors: Tianqi Gao, Exton, PA (US); Cassie M. Malloy, Blue Bell, PA (US); David A. Harris, Coatesvile, PA (US); Michael Piotrowski, Plymouth Meeting, PA (US); Leigh Krauser, Pomeroy, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 447 days.

(21) Appl. No.: 13/761,049

(22) Filed: Feb. 6, 2013

(65) Prior Publication Data
US 2014/0220276 A1    Aug. 7, 2014

(51) Int. Cl.
*D04C 1/06* (2006.01)
*F16L 57/06* (2006.01)

(52) U.S. Cl.
CPC . *D04C 1/06* (2013.01); *F16L 57/06* (2013.01); *D10B 2403/02411* (2013.01); *Y10T 428/13* (2015.01); *Y10T 428/1362* (2015.01)

(58) Field of Classification Search
CPC .................................. D04C 1/06; F16L 57/06
See application file for complete search history.

(56) References Cited

U.S. PATENT DOCUMENTS

| | | | |
|---|---|---|---|
| 3,580,289 A | 5/1971 | James et al. | |
| 4,777,859 A | 10/1988 | Plummer, Jr. | |
| 4,803,103 A | 2/1989 | Pithouse | |
| 4,946,721 A | 8/1990 | Kindervater et al. | |
| 4,946,722 A | 8/1990 | Moyer | |
| 5,000,228 A | 3/1991 | Manent et al. | |
| 5,101,556 A * | 4/1992 | Fluga et al. | 29/888.046 |
| 5,538,045 A | 7/1996 | Piotrowski et al. | |
| 5,671,649 A | 9/1997 | Piotrowski et al. | |

(Continued)

FOREIGN PATENT DOCUMENTS

| | | |
|---|---|---|
| EP | 0134864 A2 | 3/1985 |
| EP | 2549600 A1 | 1/2013 |

(Continued)

OTHER PUBLICATIONS

International Search Report mailed Apr. 11, 2014 (PCT/US2014/014618).

*Primary Examiner* — Shaun R Hurley
(74) *Attorney, Agent, or Firm* — Robert L. Stearns; Dickinson Wright, PLLC

(57) ABSTRACT

A braided protective sleeve and method of construction thereof is provided. The sleeve has a wall extending along a longitudinal axis of the sleeve. The wall includes a plurality of braided yarns forming inner and outer surfaces of the sleeve. The inner surface bounds an internal cavity and the outer surface is exposed to the surrounding environment. The yarns are braided with one another in a X/Y braid pattern with X and Y being different numerical values from one another. The numerical values of X and Y can be selected as desired to provide the sleeve with the enhanced physical performance characteristics desired. A plurality of yarns extending substantially parallel to the longitudinal axis can be interlaced with the braided yarns. The interlaced yarns can be exposed to the internal cavity and concealed from the environment; exposed to the environment and concealed from the internal cavity, or both.

35 Claims, 7 Drawing Sheets

(56) References Cited

U.S. PATENT DOCUMENTS

| | | |
|---|---|---|
| 5,914,163 A | 6/1999 | Browne |
| 6,250,193 B1 * | 6/2001 | Head .................................. 87/2 |
| 6,455,115 B1 | 9/2002 | DeMeyer |
| 7,797,919 B2 * | 9/2010 | Kirth ........................ D07B 1/02 57/210 |
| 2005/0257674 A1 | 11/2005 | Nishri et al. |
| 2010/0108171 A1 | 5/2010 | Relats Manent et al. |
| 2010/0274282 A1 * | 10/2010 | Olson ..................... A61L 17/04 606/228 |
| 2011/0275268 A1 | 11/2011 | Harris et al. |
| 2012/0037263 A1 | 2/2012 | Malloy |
| 2012/0181082 A1 | 7/2012 | Faulkner et al. |
| 2012/0330353 A1 * | 12/2012 | Yoo ......................... A61L 17/14 606/224 |
| 2013/0220104 A1 | 8/2013 | Relats Casas |
| 2014/0069540 A1 * | 3/2014 | Chesnais et al. ................ 138/32 |
| 2014/0090549 A1 * | 4/2014 | Hurlen ................. 87/9 |
| 2014/0273699 A1 * | 9/2014 | Zhang et al. .................. 442/316 |

FOREIGN PATENT DOCUMENTS

| | | |
|---|---|---|
| ES | 2261002 | 1/2006 |
| ES | WO2006122989 | 11/2006 |
| ES | WO2007014969 | 2/2007 |
| ES | WO2008119844 | 10/2008 |
| ES | WO2009144333 | 12/2009 |
| WO | 9625542 A1 | 8/1996 |

* cited by examiner

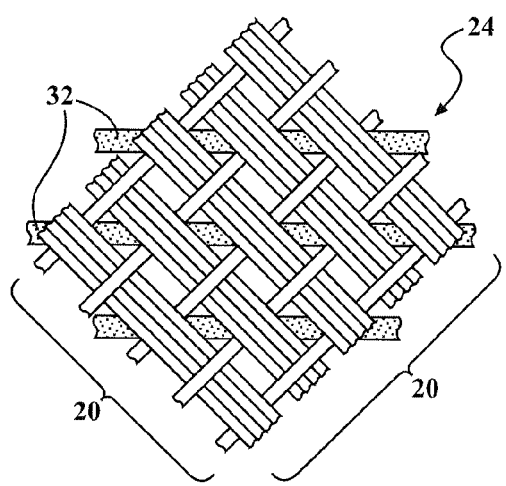
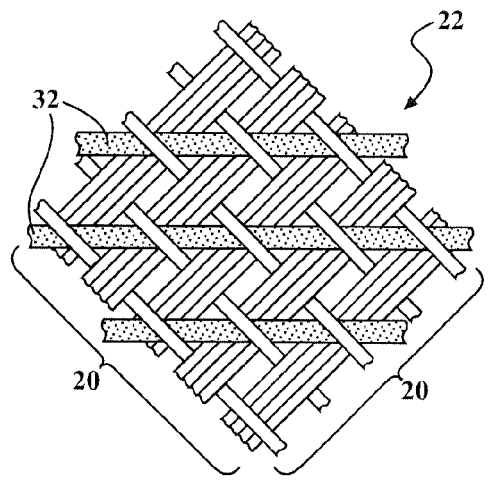
FIG. 5A    FIG. 5B
FIG. 6
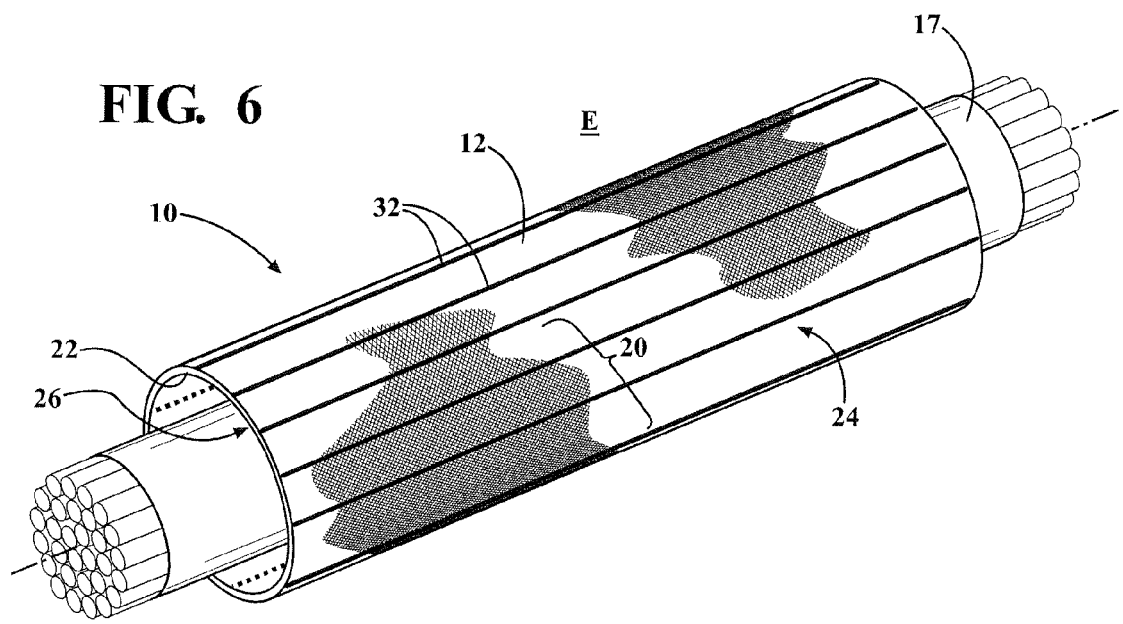

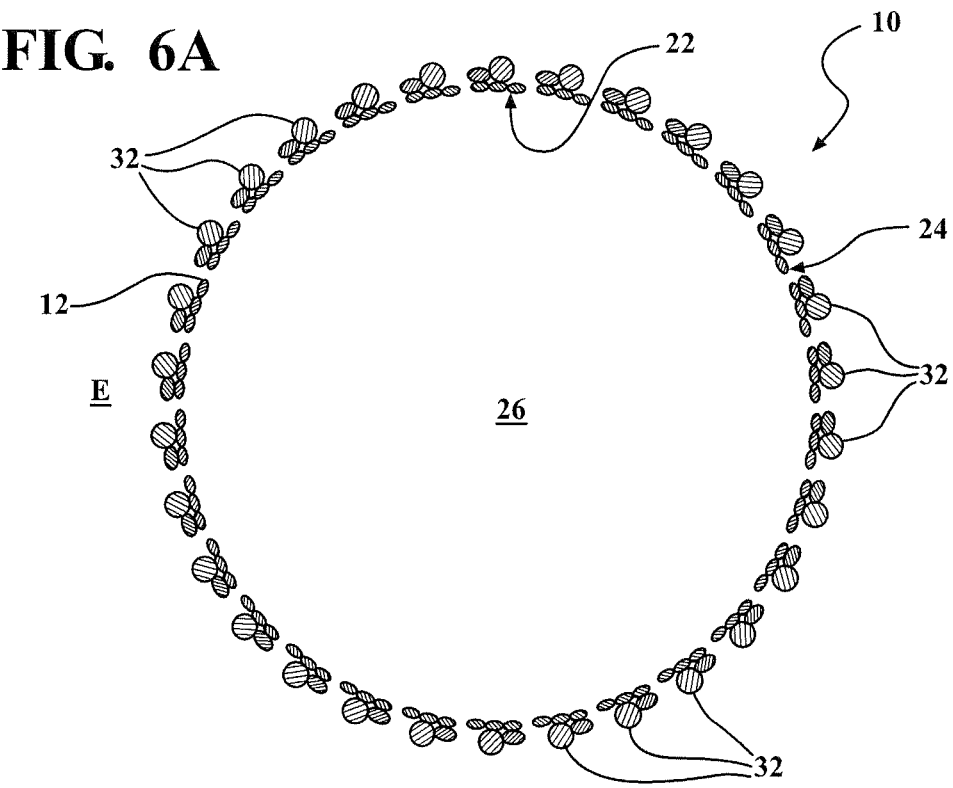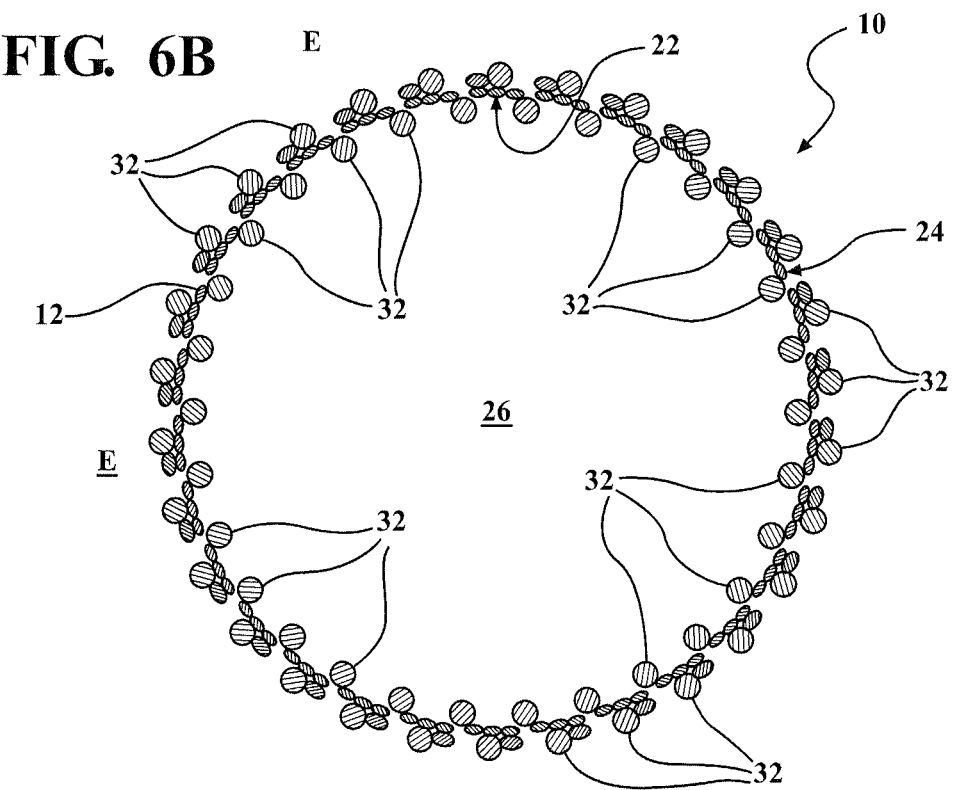

ENHANCED BRAIDED SLEEVE AND METHOD OF CONSTRUCTION THEREOF

BACKGROUND OF THE INVENTION

1. Technical Field

This invention relates generally to textile sleeves for protecting elongate members, and more particularly to braided textile sleeves and to their method of construction.

2. Related Art

In applications requiring protection against abrasion and impact forces to elongate members, such as wire harnesses or tubular members, it is known to surround the elongate member with a multi-faced woven or knitted textile sleeve. For example, if woven, the fill yarn can be provided as a first yarn type to form an inner face of the sleeve, while the warp yarn can be provided as a second type of yarn, different from the first type of yarn, to form an outer face of the sleeve. As such, the first and second yarns can be selected from the type of material best suited to provide the protection desired. Likewise, if knitted, different types of yarn can be knitted together to form respective inner and outer faces having different properties, e.g. dampening, abrasion resistance. Although woven and knitted sleeves can be useful for the their intended use, in some applications, they may prove less than optimal, including, from a functional standpoint, for example, if woven, the sleeves may be too stiff, radially inflexible or radially inelastic, and if knitted, the sleeves may be too radially elastic and bulky. Further, from a manufacturing standpoint, both woven and knit sleeves are generally costly.

SUMMARY OF THE INVENTION

In accordance with one aspect of the invention, a braided protective sleeve is provided. The sleeve has a wall extending along a longitudinal axis of the sleeve. The wall includes a plurality of braided yarns forming inner and outer surfaces of the sleeve. The inner surface bounds an internal cavity and the outer surface is exposed to the surrounding environment. The braided yarns are braided with one another in an X/Y braid pattern with X and Y being different numerical values from one another. Accordingly, the numerical values of X and Y can be selected as desired to provide the sleeve with the enhanced physical performance characteristics desired for the intended application.

In accordance with another aspect of the invention, the braided protective sleeve further includes a plurality of inserted yarns interlaced with the braided yarns, wherein the inserted yarns extend substantially parallel to the longitudinal axis. The inserted yarns further enhance the ability to provide the sleeve with the performance characteristics sought for the intended application.

In accordance with another aspect of the invention, the inserted yarns can be interlaced so that they are exposed to the internal cavity to provide enhanced protection to contents therein and/or an enhanced locating feature therein for attachment to the contents therein, wherein the inserted yarns are substantially concealed from the surrounding environment by the outer surface such that the inserted yarns are protected against damage.

In accordance with another aspect of the invention, the inserted yarns can be interlaced so that they are exposed to the surrounding environment to provide enhanced protection against abrasion and/or an enhanced locating feature for attachment to an external surface, wherein the inserted yarns can be substantially concealed from the internal cavity to avoid unwanted contact with the contents therein.

In accordance with another aspect of the invention, the inserted yarns can be interlaced so that at least some of the inserted yarns are exposed to the internal cavity and substantially concealed from the surrounding environment and at least some of the inserted yarns are exposed to the surrounding environment and substantially concealed from the internal cavity.

In accordance with another aspect of the invention, the wall is a circumferentially continuous, seamless wall.

In accordance with another aspect of the invention, the wall has opposite edges extending substantially parallel to the longitudinal axis with the opposite edges being biased into overlapping relation with one another.

In accordance with yet another aspect of the invention, a method of constructing a textile protective sleeve is provided. The method includes braiding a wall having an X/Y braid pattern extending along a longitudinal axis with an inner surface of the wall being configured to bound an internal cavity and an outer surface of the wall being exposed to the surrounding environment. Further, forming the X/Y braid pattern having different numerical values from one another.

In accordance with yet another aspect of the invention, the method can further include interlacing a plurality of yarns extending substantially parallel to the longitudinal axis with the braided yarns.

In accordance with yet another aspect of the invention, the method can further include exposing the interlaced yarns to the internal cavity and substantially concealing the interlaced yarns from exposure to the surrounding environment.

In accordance with yet another aspect of the invention, the method can further include exposing the interlaced yarns to the surrounding environment and substantially concealing the interlaced yarns from exposure to the internal cavity.

In accordance with yet another aspect of the invention, the method can further include exposing at least some of the interlaced yarns to the internal cavity and substantially concealing these yarns from exposure to the surrounding environment and exposing at least some of the interlaced yarns to the surrounding environment and substantially concealing these yarns from exposure to the internal cavity.

In accordance with yet another aspect of the invention, the method can further include providing at least some of the interlaced yarns as a low melt polymeric material.

In accordance with yet another aspect of the invention, the method can further include providing at least some of the interlaced yarns as multifilaments.

In accordance with yet another aspect of the invention, the method can further include providing at least some of the interlaced yarns as monofilaments.

In accordance with yet another aspect of the invention, the method can further include providing the braided yarns as monofilaments and multifilaments.

In accordance with yet another aspect of the invention, the method can further include setting the X and Y numerical values as odd numerical values.

In accordance with yet another aspect of the invention, the method can further include providing the yarn used in the greater of the X and Y numerical values as multifilaments and providing the yarn used in the lesser of the X and Y numerical values as monofilaments.

In accordance with yet another aspect of the invention, the method can further include setting the X and Y numerical values as even numerical values.

In accordance with yet another aspect of the invention, the method can further include braiding the wall as a circumferentially continuous, seamless wall.

In accordance with yet another aspect of the invention, the method can further include braiding the wall having opposite edges extending substantially parallel to the longitudinal axis with the edges and thermally forming the wall to bring the opposite edges into biased overlapping relation with one another.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 5A is a partial plan view of an outer surface of the sleeves of FIGS. 1 and 2 illustrating yet another braid pattern in accordance with yet another aspect of the invention used to construct the sleeves of FIGS. 1 and 2;

FIG. 5B is an inner surface of the partial plan view of FIG. 5A;

FIG. 6 is perspective view of a protective sleeve constructed in accordance with another aspect of the invention shown disposed about an elongate member to be protected;

FIG. 6A is a cross-sectional view taken generally along a line transverse to a central longitudinal axis of the sleeve of FIG. 6 as constructed in accordance with one aspect of the invention;

FIG. 6B is a view similar to FIG. 6A illustrating yet another aspect of the invention;

DETAILED DESCRIPTION OF PRESENTLY PREFERRED EMBODIMENTS

Figure 1:
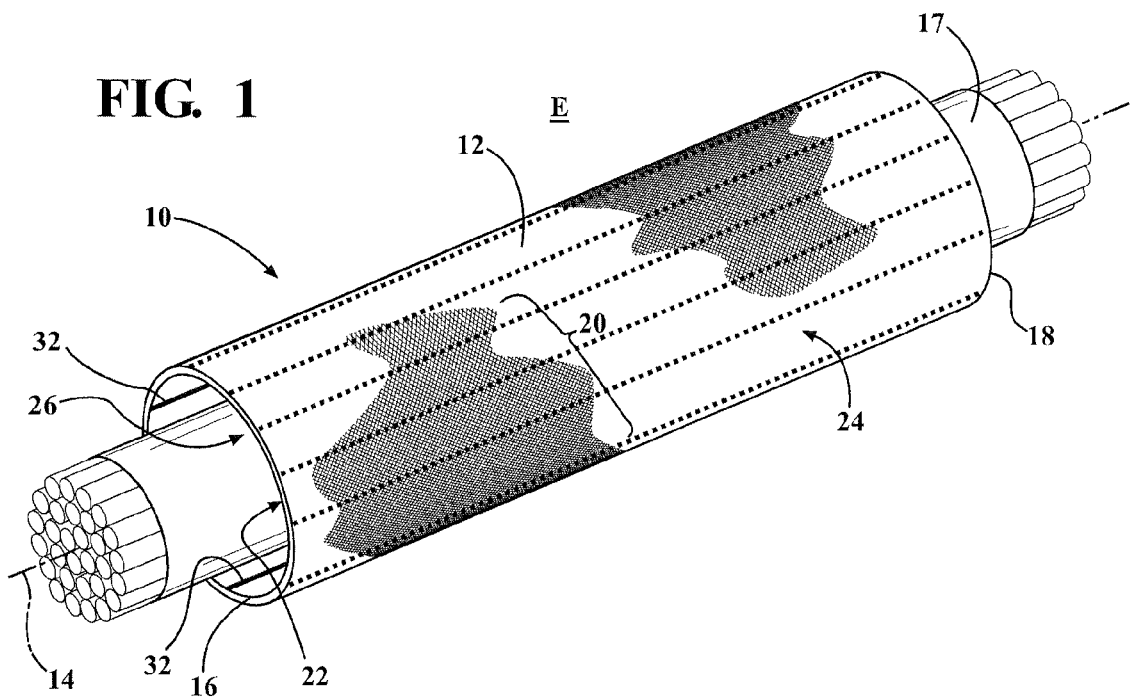
FIG. 1 is perspective view of a protective sleeve constructed in accordance with one aspect of the invention shown disposed about an elongate member to be protected.
Figure 1A:
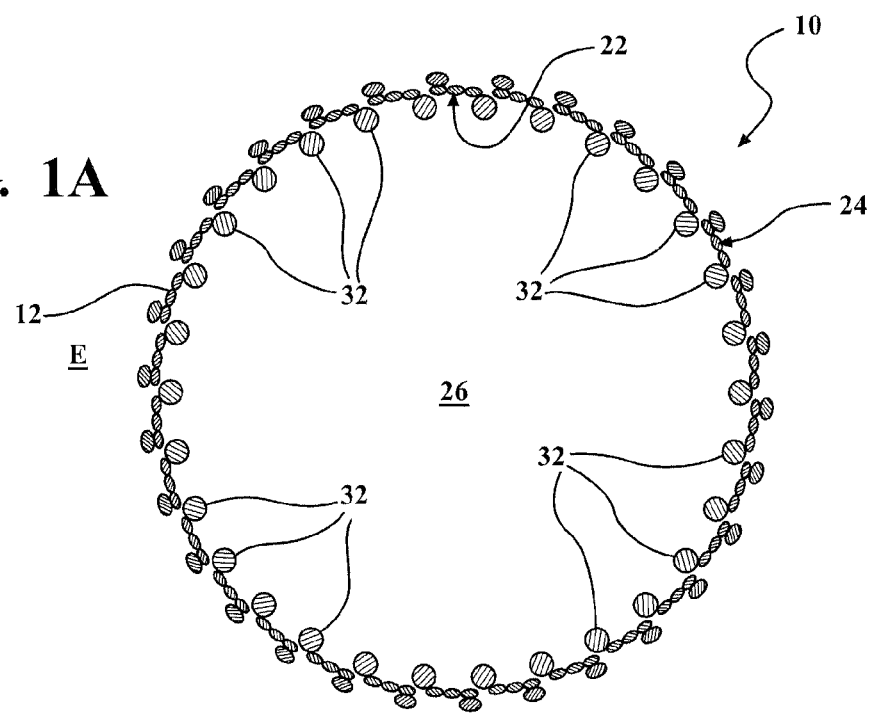
FIG. 1A is a cross-sectional view taken generally along a line transverse to a central longitudinal axis of the sleeve of FIG. 1.
Figure 2:
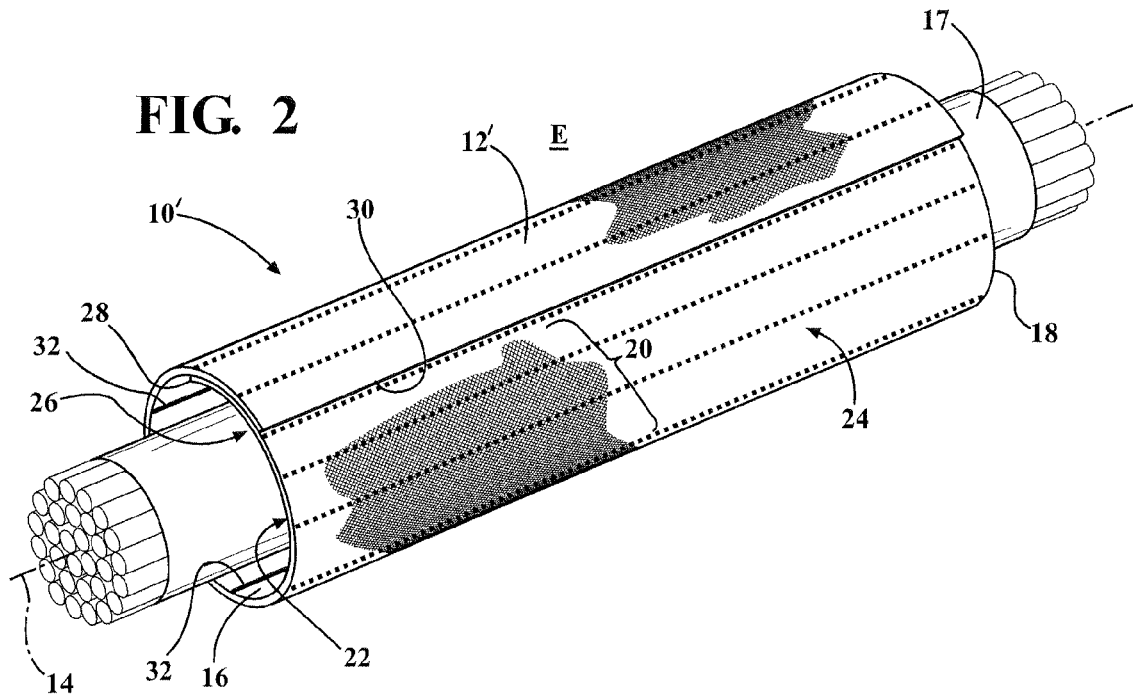
FIG. 2 is perspective view of a protective sleeve constructed in accordance with another aspect of the invention shown disposed about an elongate member to be protected.

Referring in more detail to the drawings, FIGS. 1 and 2 illustrate protective braided textile sleeves, identified respectively by reference numerals 10 and 10', constructed in accordance with certain aspects of the invention. The sleeves 10, 10' have similar braid patterns, however, the sleeve 10 has a circumferentially continuous, seamless wall 12 (FIG. 1A), while the sleeve 10' has a wrappable wall 12' (FIG. 2A), with any other notable differences being discussed hereafter. For simplicity, unless otherwise detailed, the same reference numerals are used hereafter to designate like features. The walls 12, 12' extend along a central longitudinal axis 14 between opposite ends 16, 18. The walls 12, 12' are formed via a plurality of braided yarns 20 to provide inner and outer surfaces 22, 24 of the sleeve 10. The inner surface 22 bounds an internal cavity 26 sized for receipt of an elongate member 17 therein, such as a pipe or wire harness, for example, and the outer surface 24 is exposed to the surrounding environment E. The braided yarns 20 are braided with one another in an X/Y braid pattern, wherein X and Y have different numerical values from one another. The different numerical values and types of yarns can be selected to provide the sleeve 10, 10' with the physical characteristics sought for the intended application, with some of the physical characteristics being, by way of example and without limitation, resistance to abrasion, resistance to causing abrasion to nearby components, flexibility, crush strength, ability to remain positioned relative to an elongate member containing within the sleeve, ability to remain positioned relative to a member external to the sleeve cavity, expansion ratio, conformability, and cut resistance.

Figure 2A:
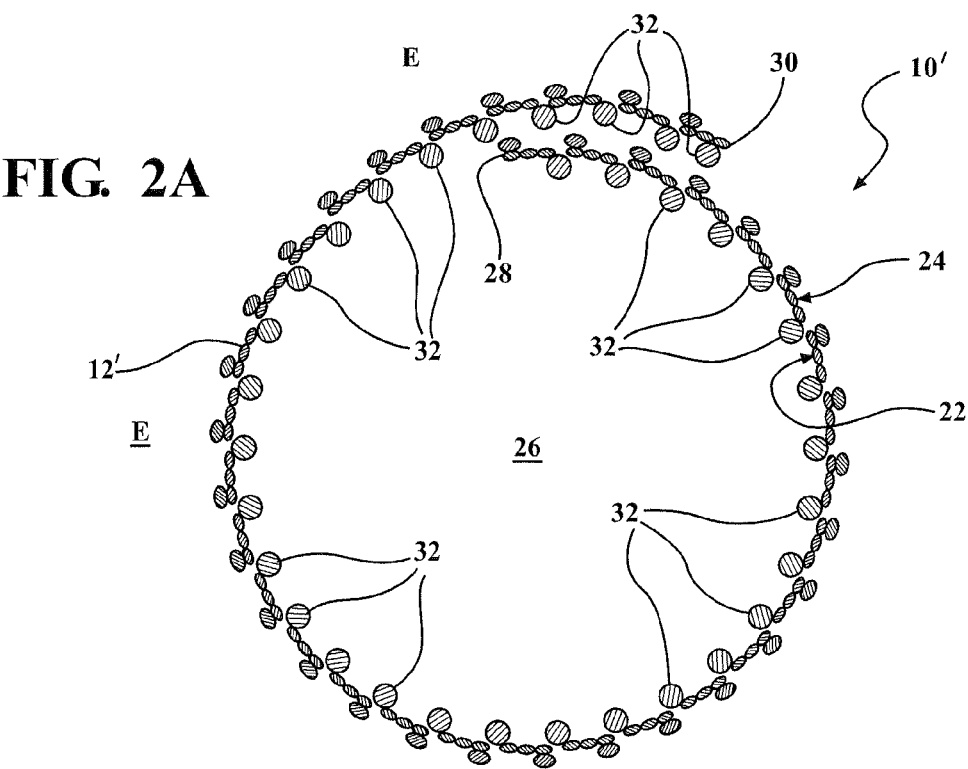
FIG. 2A is a cross-sectional view taken generally along a line transverse to a central longitudinal axis of the sleeve of FIG. 2.

If, as illustrated in FIGS. 2 and 2A, the wall 12' is formed as a circumferentially discontinuous wall, then the wall 12' has opposite lengthwise extending opposite sides, also referred to as edges, corresponding to inner and outer edges 28, 30, respectively. The opposite edges 28, 30 extend lengthwise in parallel or substantially parallel relation to the central axis 14 and terminate at the opposite ends 16, 18. At least some of the yarn 20 used to braid the wall 12' is provided as heat-settable polymeric yarn, such as polyethylene terephthalate (PET) or polyphenylene sulfide (PPS), for example, which can be heat set at a temperature of about 200-225 degrees Celsius. Upon being thermally formed and generally free from any externally applied forces, wall 12' is biased by the heat-set yarn 20 into a tubular configuration. As such, the outer edge 30 extends beyond and overlaps the inner edge 28 to fully enclose the cavity 26 circumferentially, and thus, the wall 12 provides protection against external elements about a full circumference of the wall 12 to the elongate member 17 contained in the cavity 26. The edges 28, 30, when desired, are readily extendable away from one another under an externally applied force to at least partially open and expose the cavity 26. Accordingly, the elongate member 17 can be readily disposed into the cavity 26 during assembly or removed from the cavity 26 during service. Upon releasing the externally applied force, the edges 28, 30 return automatically under the bias imparted by the heat-set yarn 20 to their relaxed, overlapping position.

The wall 12 can be braided from multifilament and/or monofilament yarns, depending on the performance characteristics needed for the intended application. For example, one or more of the yarns 20 can be provided as a heat-settable polymeric material, such as monofilaments and/or multifilaments of polyethylene terephthalate (PET) or polyphenylene sulfide (PPS), for example, which can be heat set at a temperature of about 200-225 degrees Celsius. Further, the yarns 20 can be provided as polyester, nylon, aramid, stainless steel, metallized polymeric yarns, or otherwise, depending on the physical characteristics sought for the intended application. Further, the yarns 20 can be provided with various types of outer texturing or finish, such as by being provided as air texturized multifilaments or false twist multifilament, for example.

Figure 3A:
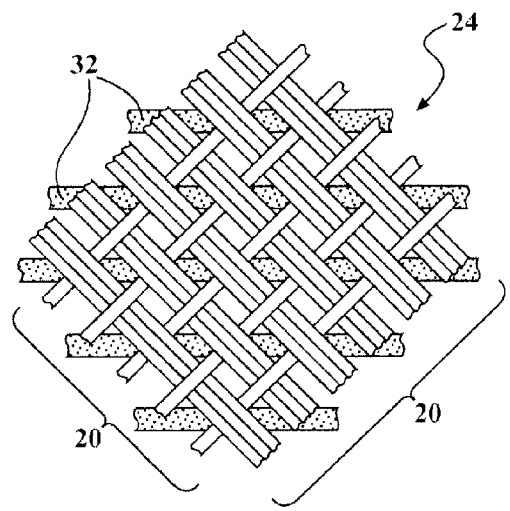
FIG. 3A is a partial plan view of an outer surface of the sleeves of FIGS. 1 and 2 illustrating one braid pattern in accordance with one aspect of the invention used to construct the sleeves of FIGS. 1 and 2.
Figure 3B:
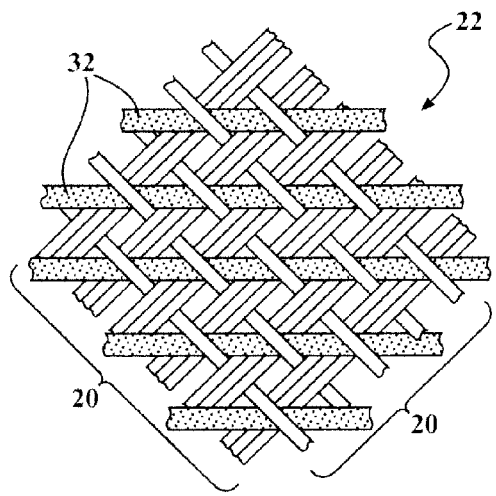
FIG. 3B is an inner surface of the partial plan view of FIG. 3A.

With reference to FIGS. 3A and 3B, in accordance with one aspect of a braid pattern used to construct the sleeves 10, 10', the yarns 20 can be braided wherein both X and Y in the X/Y braid pattern are odd numerical values, shown, by way of example, as being a 3/1 braid pattern. Accordingly, with reference to the aforementioned X/Y braid pattern, X has a numerical value of 3, corresponding to 3 yarns being side-by-side, and Y has a numerical value of 1, corresponding to 1 yarn. It should be recognized that the 3 yarns can be braided from one or more carriers crossing paths with one another, depending on the number of bobbins placed on the carrier(s). Accordingly, a single carrier can carry 3 bobbins, or 3 carriers can be used, with each of the 3 carriers carrying a single bobbin.

Figure 4A:
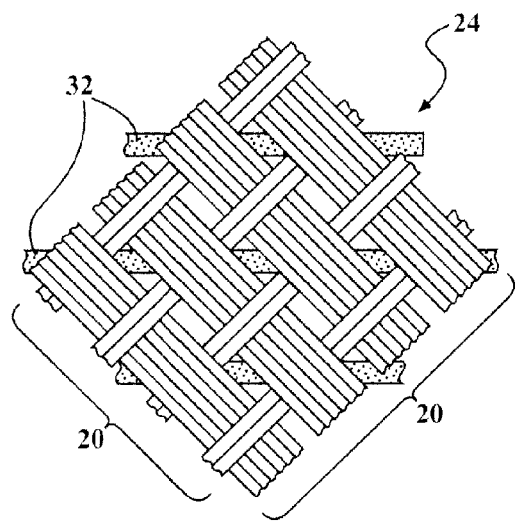
FIG. 4A is a partial plan view of an outer surface of the sleeves of FIGS. 1 and 2 illustrating another braid pattern in accordance with another aspect of the invention used to construct the sleeves of FIGS. 1 and 2.
Figure 4B:
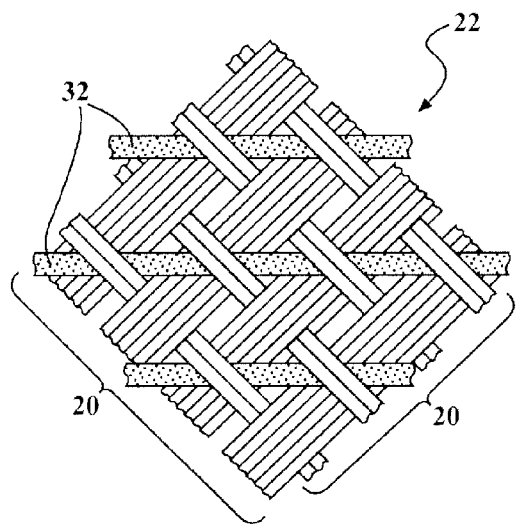
FIG. 4B is an inner surface of the partial plan view of FIG. 4A.

With reference to FIGS. 4A and 4B, in accordance with another aspect of a braid pattern used to construct the sleeves 10, 10', the yarns 20 can be braided wherein both X and Y in the X/Y braid pattern are even numerical values, shown, by way of example, as being a multiple of the aforementioned 3/1 braid pattern, resulting in a 6/2 braid pattern. Accordingly, with reference to the aforementioned X/Y braid pattern, X has a numerical value of 6, corresponding to 6 yarns being side-by-side, and Y has a numerical value of 2, corresponding to 2 yarns being side-by-side. It should be recognized that the 6/2 braid pattern, being a multiple of the 3/1 braid pattern, can be formed by placing the needed extra bobbins on the same carriers used for the 3/1 braid pattern, if desired. Otherwise, additional carriers could be used.

With reference to FIGS. 5A and 5B, in accordance with another aspect of a braid pattern used to construct the sleeves 10, 10', the yarns 20 can be braided wherein X has an odd numerical value and Y has an even numerical value, shown, by way of example, as being a 4/1 braid pattern. Accordingly, with reference to the aforementioned X/Y braid pattern, X has a numerical value of 4, corresponding to 4 yarns being side-by-side, and Y has a numerical value of 1, corresponding to 1 yarn.

It should be recognized that the types of yarn used in the various locations of the braid patterns discussed above can be selected as desired. For example, with regard to the 3/1 braid pattern, the 3 side-by-side yarns can be provided as highly texturized multifilament yarn and the single yarn can be provided as a monofilament. As such, the outwardly exposed side-by-side multifilament yarns provide enhanced coverage on the outer surface 24, as high as 96.6%, and the high strength single monofilament provides the balance of the coverage.

In addition to the braided yarns 20, the wall 12, 12' can include a plurality of inserted yarns 32 that extend parallel or substantially parallel to the central longitudinal axis 14, thereby forming a tri-axial braid. The inserted yarns 32 are interlaced with the braided yarns 20 during the braiding process. The inserted yarns 32 are inserted from base plates, with the location of the inserted yarns 32, internal (FIGS. 1-5), external (FIGS. 6A, 7A), internal and external (FIGS. 6B, 7B), being determined based on the location of the base plates relative to the carriers.

For example, as shown in FIGS. 1-5, the inserted yarns 32 can be inserted to extend along the inner surface 22 of the wall 12, 12', and thus, are entirely or substantially exposed to the internal cavity 26 while being concealed or substantially concealed from the surrounding environment E by the outer surface 24. Accordingly, while viewing the sleeve 10, 10' from the outside environment E, the inserted yarns 32 are indiscernible. As such, the inserted yarns 32 are substantially concealed and protected from the environment E, while at the same time, able to provide the desired features and protection to the sleeve 10, 10' and the contents 17 therein.

Figure 7:
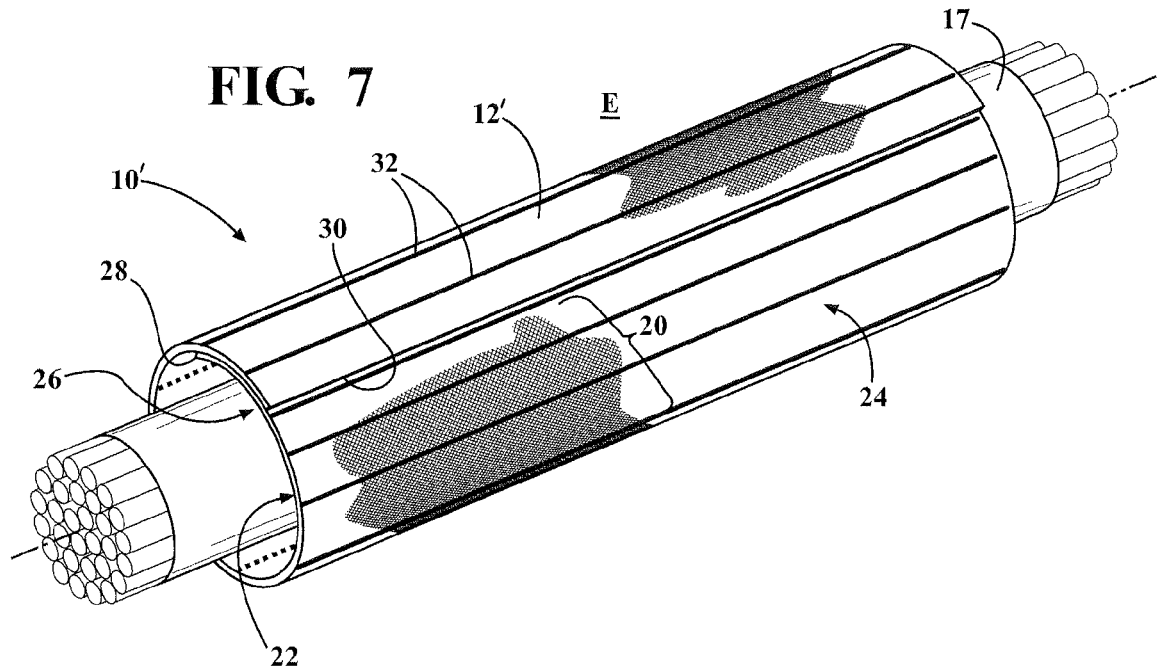
FIG. 7 is perspective view of a protective sleeve constructed in accordance with yet another aspect of the invention shown disposed about an elongate member to be protected.
Figure 7A:
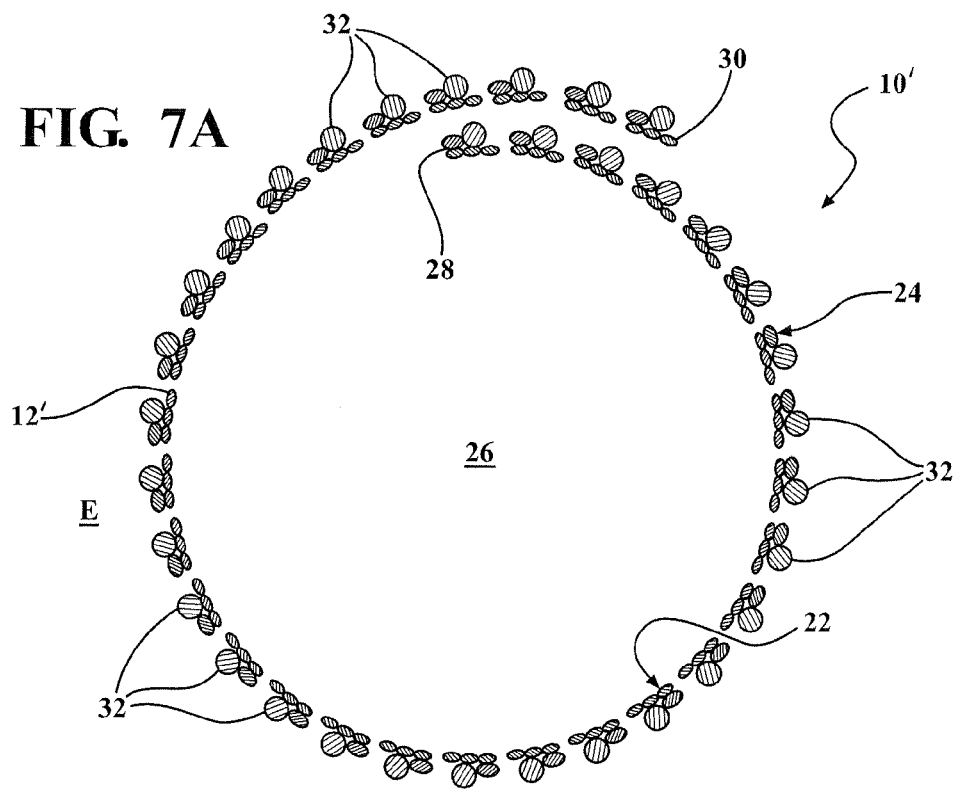
FIG. 7A is a cross-sectional view taken generally along a line transverse to a central longitudinal axis of the sleeve of FIG. 7 as constructed in accordance with one aspect of the invention.

In another example, as shown in FIGS. 6A and 7A, the inserted yarns 32 can be inserted to extend along the outer surface 24 of the wall 12, 12', and thus, are entirely or substantially exposed to the environment E, while being concealed or substantially concealed from the internal cavity 26 by the inner surface 22. Accordingly, while viewing the sleeve 10, 10' from the outside environment E, the inserted yarns 32 are visible. As such, the inserted yarns 32 are substantially concealed and shield from contacting the elongate member 17 within the cavity 26, while at the same time, able to provide the desired features and protection to the sleeve 10, 10' along the outer surface 24 thereof.

Figure 7B:
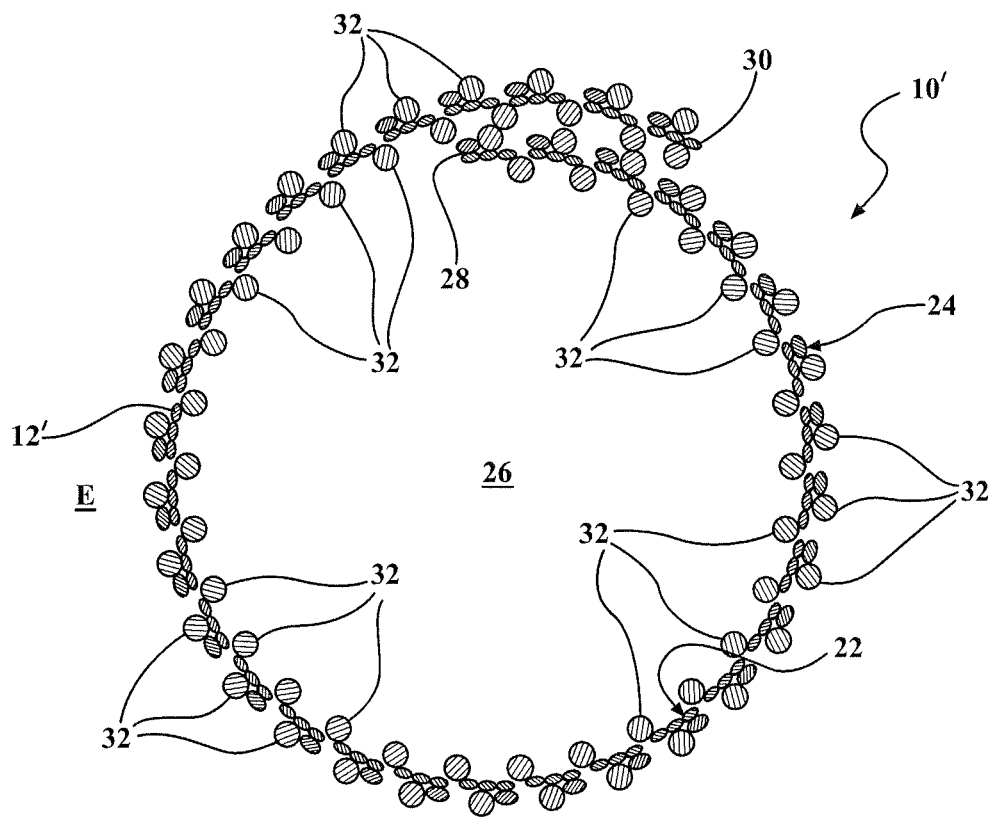
FIG. 7B is a view similar to FIG. 7A illustrating yet another aspect of the invention.

In yet another example, as shown in FIGS. 6B and 7B, the inserted yarns 32 can be inserted to extend along both the inner surface 22 and the outer surface 24 of the wall 12, 12', and thus, the respective inserted yarns 32 are entirely or substantially exposed to the internal cavity 26 and the environment E. It should be recognized that the inserted yarns 32 along the inner surface 22, though exposed to the internal cavity 26, remain indiscernible from the outer surface 24 and that the inserted yarns 32 along the outer surface 24, though exposed to the environment E, remain concealed and shielded from the internal cavity 26. Accordingly, the yarns 32 inserted along the inner surface 22 can be selected to perform their intended function, while the yarns inserted along the outer surface 24 can be selected to perform their intended function, while at least some of the types of yarn selected to extend along the inner and outer surfaces 22, 24 may be different.

The inserted yarns 32 can be provided as multifilaments, monofilaments or a combination thereof, and can be provided in any desired type of material, whether polymeric, metallic, and organic or inorganic fibers. In one example, at least some of the inserted yarns 32 are provided as an adhesive yarn, such as those including a low melt polymeric material, for example, low melt nylon or low melt polyester, or the low melt yarn can be provided as a bicomponent yarn having an outer sheath formed of the low melt polymeric material with an inner core be formed of a higher temperature, increased strength polymeric material. As such, in application, if inserted along the inner surface 22, the low melt material provides a mechanism by which to attach the inner surface 22 of the sleeve 10, 10' to the elongate member 17 therein, thereby securing the sleeve 10, 10' against relative movement with the elongate member 17. Further, if inserted along the outer surface 24, the low melt material provides a mechanism by which to attach the outer surface 24 of the sleeve 10, 10' to a neighboring member, thereby securing the sleeve 10, 10' against relative movement with the neighboring member. In addition, at least some of the inserted yarns 32 can be provided as a soft, cushion material, such as a low density multifilament yarn, for example, thereby providing a cushion barrier to the elongate member 17 within the sleeve 10, 10'. Further, at least some of the inserted yarns 32 can be provided as a high strength, abrasion resistant monofilament, such as along the outer surface 24, thereby providing enhanced protection to the braided yarns 20 against abrasion or other types of damage.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A braided protective sleeve, comprising:
a wall extending along a longitudinal axis of said sleeve, said wall including a plurality of braided yarns forming inner and outer surfaces of said sleeve, said inner surface bounding an internal cavity and said outer surface being exposed to the surrounding environment, said braided yarns being braided with one another in a X/Y braid pattern with X representing the number of yarns in side-by-side relation extending in a first helical direction and Y representing the number of yarns in side-by-side relation extending in a second helical direction opposite said first helical direction, with X and Y being different numerical values from one another; and
further including a plurality of inserted yarns, said inserted yarns extending substantially parallel to said longitudinal axis and being interlaced with said braided yarns.

2. The braided protective sleeve of claim 1 wherein said inserted yarns are exposed to said internal cavity and substantially concealed from the surrounding environment by said outer surface.

3. The braided protective sleeve of claim 1 wherein said inserted yarns are exposed to the surrounding environment and substantially concealed from said internal cavity.

4. The braided protective sleeve of claim 1 wherein at least some of said inserted yarns are exposed to said internal cavity and substantially concealed from the surrounding environment by said outer surface and at least some of said inserted yarns are exposed to the surrounding environment and substantially concealed from said internal cavity.

5. The braided protective sleeve of claim 1 wherein at least some of said inserted yarns are bicomponent polymeric material.

6. The braided protective sleeve of claim 1 wherein at least some of said inserted yarns are multifilaments.

7. The braided protective sleeve of claim 1 wherein at least some of said inserted yarns are monofilaments.

8. A braided protective sleeve, comprising:
a wall extending along a longitudinal axis of said sleeve, said wall including a plurality of braided yarns forming inner and outer surfaces of said sleeve, said inner surface bounding an internal cavity and said outer surface being exposed to the surrounding environment, said braided yarns being braided with one another in a X/Y braid pattern with X representing the number of yarns in side-by-side relation extending in a first helical direction and Y representing the number of yarns in side-by-side relation extending in a second helical direction opposite said first helical direction, with X and Y being different numerical values from one another; and
wherein said braided yarns are provided as monofilaments and multifilaments.

9. The braided protective sleeve of claim 1 wherein X and Y are odd numerical values.

10. The braided protective sleeve of claim 9 wherein the greater of said numerical values is provided as a multifilament and the lesser of the numerical values is provided as a monofilament.

11. The braided protective sleeve of claim 10 wherein X has a numerical value of 1 and Y has a numerical value of 3.

12. The braided protective sleeve of claim 1 wherein X and Y are even numerical values.

13. The braided protective sleeve of claim 12 wherein the greater of said numerical values is provided as a multifilament and the lesser of the numerical values is provided as a monofilament.

14. The braided protective sleeve of claim 13 wherein X has a numerical value of 2 and Y has a numerical value of 6.

15. The braided protective sleeve of claim 1 wherein X and Y have numerical values that are multiple of one another.

16. The braided protective sleeve of claim 1 wherein X has an odd numerical value and Y has an even numerical value.

17. The braided protective sleeve of claim 1 wherein said wall is a circumferentially continuous, seamless wall.

18. The braided protective sleeve of claim 1 wherein said wall has opposite edges extending substantially parallel to said longitudinal axis, said edges being biased into overlapping relation with one another.

19. A method of constructing a textile protective sleeve, comprising:
braiding a wall having a X/Y braid pattern extending along a longitudinal axis with an inner surface of the wall bounding an internal cavity and an outer surface of the wall being exposed to the surrounding environment with the X representing the number of yarns in side-by-side relation extending in a first helical direction and Y representing the number of yarns in side-by-side relation extending in a second helical direction opposite said first helical direction, with the X and Y values of the X/Y braid pattern being different numerical values from one another; and
further including interlacing a plurality of yarns extending substantially parallel to the longitudinal axis with the braided yarns.

20. The method of claim 19 further including exposing the interlaced yarns to the internal cavity and substantially concealing the interlaced yarns from exposure to the surrounding environment.

21. The method of claim 19 further including exposing the interlaced yarns to the surrounding environment and substantially concealing the interlaced yarns from exposure to the internal cavity.

22. The method of claim 19 further including exposing at least some of the interlaced yarns to the internal cavity and substantially concealing them from exposure to the surrounding environment and exposing at least some of the interlaced yarns to the surrounding environment and substantially concealing them from exposure to the internal cavity.

23. The method of claim 19 further including providing at least some of the interlaced yarns as a bicomponent polymeric material.

24. The method of claim 19 further including providing at least some of the interlaced yarns as multifilaments.

25. The method of claim 19 further including providing at least some of the interlaced yarns as monofilaments.

26. A method of constructing a textile protective sleeve, comprising:
braiding a wall having a X/Y braid pattern extending along a longitudinal axis with an inner surface of the wall bounding an internal cavity and an outer surface of the wall being exposed to the surrounding environment with the X representing the number of yarns in side-by-side relation extending in a first helical direction and Y representing the number of yarns in side-by-side relation extending in a second helical direction opposite said first helical direction, with the X and Y values of the X/Y braid pattern being different numerical values from one another; and
further including providing the braided yarns as monofilaments and multifilaments.

27. The method of claim 19 further including setting the X and Y numerical values as odd numerical values.

28. The method of claim 27 further including providing the yarn used in the greater of the X and Y numerical values as multifilaments and providing the yarn used in the lesser of the X and Y numerical values as monofilaments.

29. The method of claim 28 further including setting the X value having a numerical value of 1 and setting the Y value having a numerical value of 3.

30. The method of claim 19 further including setting the X and Y numerical values as even numerical values.

31. The method of claim 30 further including providing the yarn used in the greater of the X and Y numerical values as multifilaments and providing the yarn used in the lesser of the X and Y numerical values as monofilaments.

32. The method of claim 30 further including setting the X value having a numerical value of 2 and setting the Y value having a numerical value of 6.

33. The method of claim 19 further including braiding the wall as a circumferentially continuous, seamless wall.

34. The method of claim 19 further including braiding the wall having opposite edges extending substantially parallel to the longitudinal axis with the edges.

35. The method of claim 34 further including thermally forming the wall to bring the opposite edges into biased overlapping relation with one another.

* * * * *